GAMMA CORRECTION CIRCUITS
Filed April 30, 1964 2 Sheets-Sheet 1
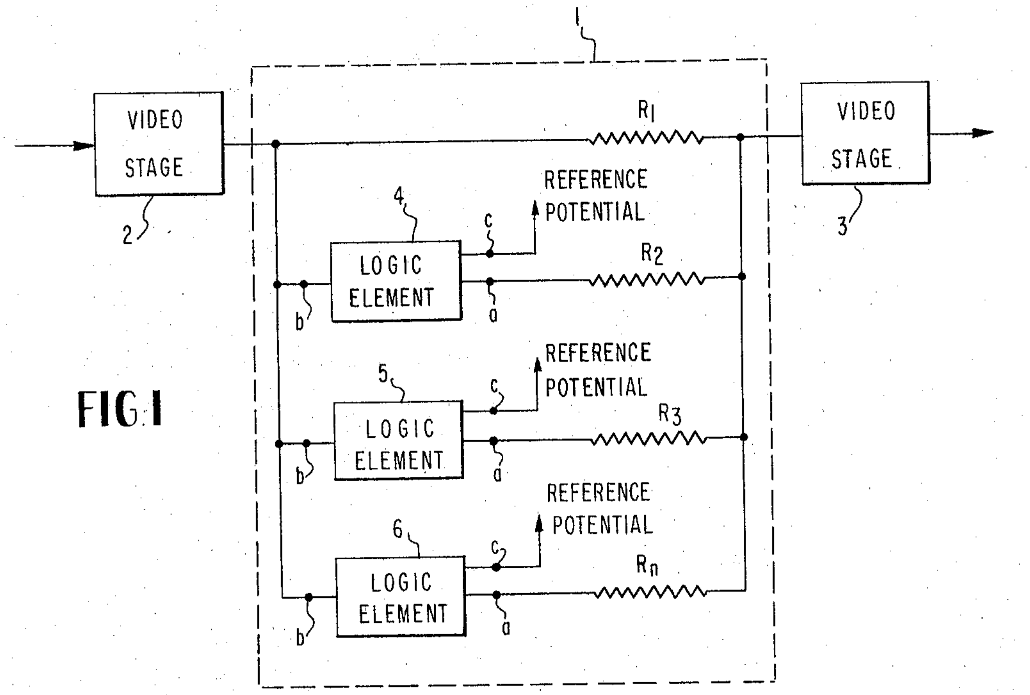
FIG. 1
FIG. 2a
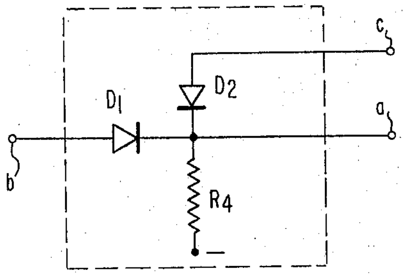
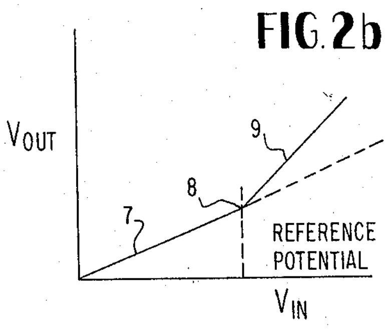
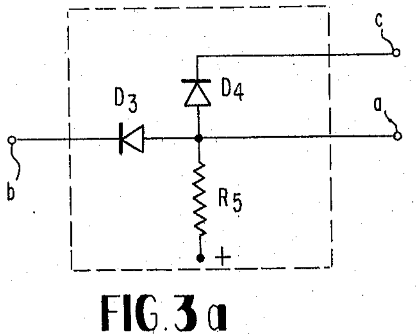
FIG. 3a
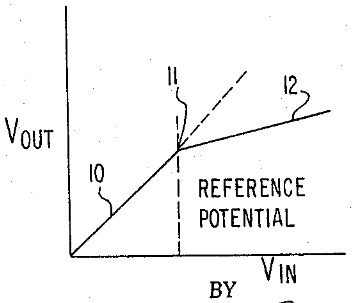
FIG. 3b
INVENTOR.
ALAN D. BEDFORD
BY
Frank L. Neuhauser
ATTORNEY INVENTOR.
ALAN D. BEDFORD
BY Frank L. Neuhauser
ATTORNEY 3,277,318
Patented Oct. 4, 1966

3,277,318

GAMMA CORRECTION CIRCUITS

Alan D. Bedford, Pittsburgh, Pa., assignor to General Electric Company, a corporation of New York Filed Apr. 30, 1964, Ser. No. 363,862
7 Claims. (Cl. 307—88.5)

The present invention relates to gamma correction circuitry and, more specifically, to circuitry for use in television systems to control the effective value of gamma.

In television, the exponent of the power law which approximates the curve of output magnitude with respect to input magnitude is referred to as gamma. It is necessary in television and like systems to control the gamma to compensate for inherent nonlinearities which exist in pick-up and reproducing elements. The nature of this inherent nonlinearity differs greatly among various types of devices such as cathode ray tubes and light valve tubes.

In prior art gamma correction circuitry several approaches were utilized. In one approach a nonlinear element was utilized to compensate for the inherent nonlinearities. Another approach utilized a plurality of driving impedances serially connected to a stage in the video chain, each of the plural driving impedances being switched into the circuit at discrete levels of the input signal. Somewhat similarly, another approach employed a plurality of load impedance connected in shunt with a stage of the video chain, each load impedance being in turn switched into the circuit at various levels of the output from the preceding stage.

The prior art approach wherein a nonlinear element was employed has proved unsatisfactory because total reliance is placed upon the characteristics of a particular element, such characteristics varying from element to element and being subject to change over a period of time. In the prior art circuitry employing either plural series driving impedances or plural shunt load impedances satisfactory operation is not obtainable since the nonlinearity which can be achieved is limited.

The present invention overcomes the prior art problems by presenting gamma correction circuitry wherein the requisite large range of nonlinearity is achievable while at the same time maintaining the requisite accuracy.

Accordingly, an object of the present invention is to provide an improved gamma correction circuit.

Another object is to provide an improved gamma correction circuit wherein a large range of nonlinearity is achievable.

Yet another object is to provide an improved gamma correction circuit which maintains the requisite accuracy.

These and other objects are achieved in one embodiment of the invention by the provision of a plurality of logic elements connected between first and second video stages. Each logic element has associated therewith an adder impedance and has applied thereto a reference potential. Each adder impedance is switched from operation as a shunt load impedance to operation as a series driving impedance in accordance with the relative magnitudes of the output of the first stage and the associated reference potential.

The novel and distinctive features of the invention are set forth in the appended claims. The invention itself, together with further objects and advantages thereof, may best be understood by reference to the following description and accompanying drawings in which:

FIGURE 1 is a block diagram of the present invention.

FIGURE 2(*a*) is a schematic of a logic element which can be employed in the circuitry of FIGURE 1 and FIGURE 2(*b*) is the characteristic of a gamma corrector in accordance with the present invention employing the logic element of FIGURE 2(*a*).

FIGURE 3(*a*) is a schematic of another logic element which can be employed in the circuitry of FIGURE 1 and FIGURE 3(*b*) is the characteristic of a gamma corrector in accordance with the present invention employing the logic element of FIGURE 3(*a*).

Figure 4:
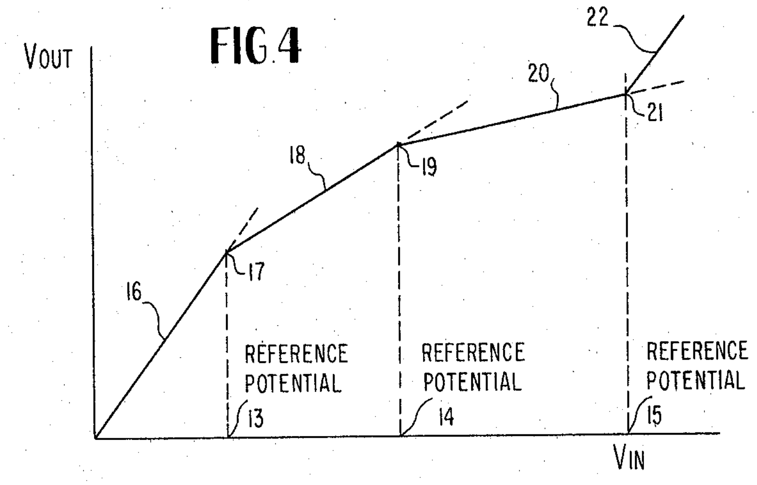
FIGURE 4 depicts the characteristic of a system corrected in accordance with the circuitry of FIGURE 1.

Referring to FIGURE 1 there is shown generally at 1 the gamma correction circuitry of applicant's invention. The gamma correction circuitry 1 is positioned between the output of a video stage 2 and the input of a video stage 3 in order to introduce controlled nonlinearities to compensate for inherent nonlinearities in the system.

The gamma correction circuitry 1 comprises a series driving impedance such as resistance R1 and a plurality of logic elements 4, 5, and 6 having adder impedances such as resistances R2, R3, and $R_n$ respectively associated therewith.

Each of the logic elements 4, 5, and 6 is provided with three terminals *a*, *b*, and *c*. Terminal *a* of each logic element is connected through the associated adder impedance to the input of the video stage 3. Terminal *b* of each of the logic elements is connected to the output of the video stage 2. Terminal *c* of each of the logic elements is connected to a discrete reference potential, the reference potential providing an A.C. ground at each terminal *c* and applying a D.C. voltage thereto.

The logic elements 4, 5 and 6 serve to switchably connect the adder impedances R2, R3, and $R_n$ respectively either to the terminal *b* or terminal *c*. Thus, the added impedances R2, R3 and $R_n$ can be switched from serving as series driving impedances when terminal *a* is connected to terminal *b* to serving as shunt load impedances when terminal *a* is connected to terminal *c* and thus to A.C. ground. The point at which the switching of the various logic elements 4, 5, and 6 occurs is defined by the relative magnitudes between the output of the video stage 2 and the reference potential present at the terminal *c* of the respective logic elements.

It will be seen that in the circuit of FIGURE 1 the series driving impedance R1 forms a voltage divider with the input impedance of the video stage 3. If one of the adder impedances R2, R3 or $R_n$ is connected to terminal *c* of the associated logic element and thus to A.C. ground, a greater portion of the output signal of the video stage 2 appears across impedance R1. However, should the associated logic element switch the adder impedance R2, R3, or $R_n$ to operation as a series driving impedance a larger proportion of the output signal of the video stage 2 will now appear at the input of the video stage 3. Thus, a double effect is obtained by switching the adder impedances R2, R3, and $R_n$ from operation as shunt load impedances to operation as series driving impedances and an increased range of nonlinearity is achievable while at the same time maintaining the requisite accuracy and independent switching of the various adder impedances.

Referring to FIGURE 2(*a*) there is shown a logic element for use in the circuitry of FIGURE 1 like reference numerals being given to common elements. The logic element depicted in FIGURE 2(*a*) comprises first and second serially-connected unidirectional conduction devices such as diodes D1 and D2 having their cathodes connected in common. The junction between the diodes D1 and D2 is connected to the terminal *a* whereas the anode of the diode D1 is connected to the terminal *b* and the anode of the diode D2 is connected to terminal *c*. The junction between the diodes D1 and D2 is connected through a suitable resistance R4 to a negative supply (not shown), the resistance R4 serving to provide for conduction of one of the diodes D1 and D2 in accordance with the relative magnitudes of the reference voltage at terminal *c* and the voltage at terminal *b*.

The operation of the circuit of FIGURE 2(*a*) can best be appreciated by initially considering the voltage at the terminal *b* to be less than the reference potential at terminal *c*. In this condition the diode D1 is reverse biased while the diode D2 is forward biased. Thus, the associated adder impedance connected to the terminal as shown in FIGURE 1 is connected through diode D2 to the A.C. ground at terminal *c* and the adder impedance serves as a shunt load impedance. When the voltage at the terminal *b* increases above the reference potential, the diode D1 becomes forward biased thereby reverse biasing the diode D2. Thus, the associated adder impedance connected to terminal *a* is now connected through diode D1 to terminal *b* and the adder impedance now serves as a series driving impedance.

The relationship of the output voltage of the gamma circuitry 1 as shown in FIGURE 1 to the input voltage when a single logic element such as shown in FIGURE 2(*a*) is employed in the circuit of FIGURE 1 is depicted in FIGURE 2(*b*). When the voltage at terminal *b* is below the reference voltage at the terminal *c*, the associated adder impedance serves as a shunt load impedance thus causing a larger proportion of the voltage to be dropped across the series driving impedance R1 as represented by line segment 7. However, at the break point 8 (i.e. the point where the voltage at the terminal *b* equals that of the reference potential at terminal *c*) the associated adder impedance switches to operation as a series driving impedance and thus a larger proportion of the voltage is impressed upon the input of the video stage 3 as represented by line segment 9. Thus, in effect the gain of the system is increased in the area represented by the line segment 9 over that represented by the line segment 7 by the action of the logic element in switching the associated adder impedance from operation as a shunt load impedance to operation as a series driving impedance.

Referring to FIGURE 3(*a*) a logic element is shown comprising first and second serially-connected unidirectional conduction devices such as diodes D3 and D4 having their anodes commonly connected. The cathode of diode D3 is connected to terminal *c*. The junction between the diodes D3 and D4 is connected to the terminal *a* and thus to the associated adder impedance, the junction between the two diodes also being connected to a suitable positive supply through a resistance R5 which provides for conduction of one of the diodes D3 and D4 in accordance with the relative magnitude of the reference voltage at terminal *c* and the voltage at terminal *b*.

The operation of the circuit of FIGURE 3(*a*) can best be appreciated by initially considering the voltage at the terminal *b* to be less than the reference potential at terminal *c*. In this condition the diode D3 is forward biased while the diode D4 is reverse biased and the adder impedance connected to terminal *a* is connected through diode D3 to the terminal *b* thus serving as a series driving impedance. When the voltage at terminal *b* rises above the reference potential, the diode D3 becomes reverse biased while the diode D4 becomes forward biased. Thus, the adder impedance connected to terminal *a* is now connected through the diode D4 to the terminal *c* and A.C. ground and the adder impedance serves as a shunt load impedance.

Referring to the characteristic shown in FIGURE 3(*b*) of a gamma corrector employing the logic element of FIGURE 3(*a*), it will be seen that in the region defined by line segment 10 the associated adder impedance serves as a series driving impedance and thus a larger proportion of the input voltage will appear at the output of the gamma correction circuitry of FIGURE 1. When the voltage at the terminal *b* rises to the break point 11 (i.e. equal to the reference potential) the associated adder impedance becomes a shunt load impedance and a larger proportion of the input voltage is dropped across the series driving impedance R1. Thus, in effect the gain of the system is reduced in the area represented by the line segment 12 with respect to that represented by the line segment 10.

Referring to FIGURE 4 there is shown for purposes of example a characteristic of a gamma correction circuit in accordance with the present invention as shown in FIGURE 1 wherein three logic elements are employed to obtain the desired characteristic. To obtain the characteristic shown in FIGURE 4 the logic elements 4 and 5 in FIGURE 1 can be of the type shown in FIGURE 3(*a*) whereas the logic element 6 can be of the type shown in FIGURE 2(*a*). Assuming that reference potentials 13, 14, and 15 as shown in FIGURE 4 are applied to terminals *c* of logic elements 4, 5, and 6 respectively and that the associated adder impedances R2, R3, and $R_n$ are selected to provide the desired slope in the various portions of the characteristic, a characteristic as shown in FIGURE 4 will result.

In the portion of the characteristic of FIGURE 4 defined by line segment 16, in which region the input voltage to the gamma correction circuitry is below any of the reference potentials, it will be seen that the voltage applied to the input of the video stage 3 is defined by a network comprising the resistances $R_2$ and $R_3$ acting as series driving impedances in shunt with the series driving impedance R1 whereas the adder impedance $R_n$ is operating as a shunt load impedance.

When the break point 17 is reached as represented by the reference potential 13, the adder impedance R2 is switched from operation as a series driving impedance to operation as a shunt load impedance and reduced slope region 18 of the characteristic results. Similarly, when the voltage input reaches the break point 19 as defined by the reference potential 14, the adder impedance R3 is switched from operation as a series driving impedance to operation as a shunt load impedance and a further reduced slope portion 20 of the characteristic results.

When the input voltage to the gamma correction circuitry of FIGURE 1 reaches the reference potential 15 applied to the terminal *c* of logic element 6, the break point 21 occurs as the adder impedance $R_n$ is shifted from operation as a shunt load impedance to a series driving impedance, thus, the slope of the characteristic increases as indicated by line segment 22.

It will be appreciated that any number of logic elements as shown in FIGURE 1 might be employed along with suitably chosen adder impedances and reference potentials to approximate almost any desired characteristic.

Figure 5:
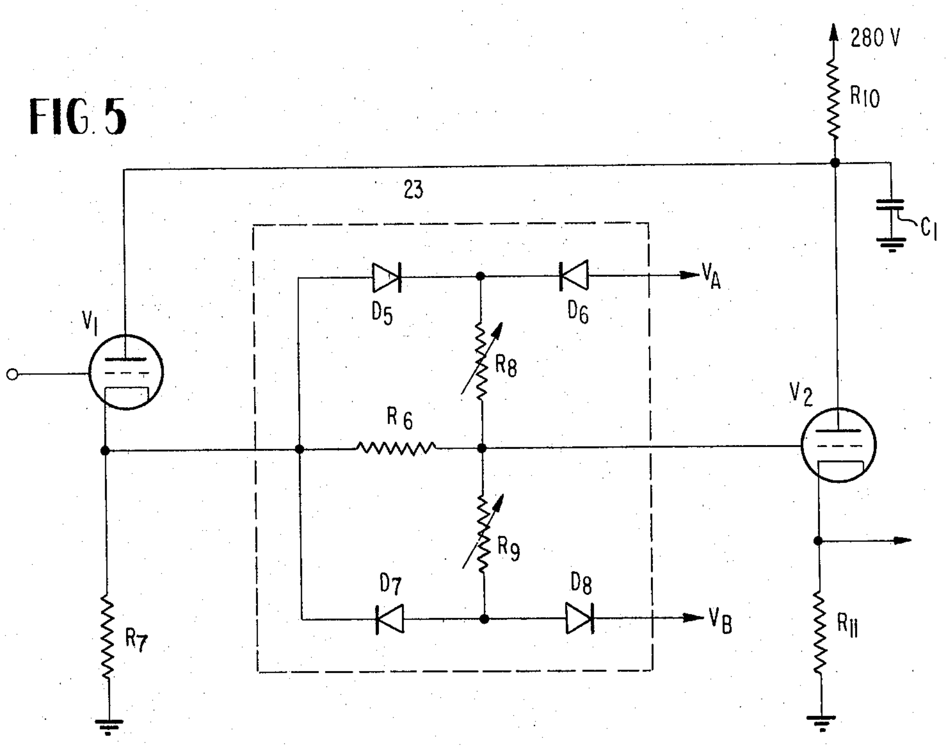
FIGURE 5 depicts in schematic form a simplified embodiment of applicant's invention.

Referring to FIGURE 5 there is shown an embodiment of applicant's invention utilizing gamma correction circuitry 23 employing one logic element similar to that of FIGURE 2(*a*) and one logic element similar to that of FIGURE 3(*a*). When this configuration is employed the separate adder impedances R2, R3, and $R_n$ shown in FIGURE 1 can be eliminated, resistances corresponding to R4 and R5 of the logic elements of FIGURES 2(*a*) and 3(*a*) respectively serving as adder impedances.

The gamma correction circuitry 23 of FIGURE 5 comprises a series driving impedance R6 connected between the output of a cathode follower stage V1 having a cathode resistance R7 and the control grid of tube V2. A first logic element similar to that shown in FIGURE 2(*a*) comprises diodes D5 and D6 which are serially connected between a reference potential $V_A$ and the output of the cathode follower V1. The cathodes of the diodes D5 and D6 are commonly connected and a potentiometer R8 is connected between the junction of the diodes D5 and D6 and the control grid of the tube V2. Potentiometer R8 serves to both provide a current path to allow for conduction of the diodes D5 and D6 and act as an adder impedance.

Similarly, serially-connected diodes D7 and D8 are connected between a reference potential $V_B$ and the output of the cathode follower V1. The anodes of the diodes D7 and D8 are commonly connected and are returned to the grid of the tube V2 through a potentiometer R9. The potentiometer R9 serves to both provide a current path to allow for conduction of the diodes D7 and D8 and act as an adder impedance.

The anodes of the tubes V1 and V2 are returned through a suitable decoupling resistance R10 to a positive voltage supply such as 280 volts. A decoupling capacitor C1 is connected between the low side of the resistance R10 and ground.

The output is taken from the cathode of the tube V2 as developed across the cathode resistor R11.

It will be seen from circuit of FIGURE 5 that the reference voltage $V_A$ and $V_B$ can be varied to control the break points and the potentiometers R8 and R9 can be varied to control the value of the adder impedances. Thus, the circuit of FIGURE 5 can be utilized to approximate a large number of desired characteristics.

Two cases must be considered to appreciate the operation of the circuit of FIGURE 5. Operation must be considered where the reference voltage $V_A$ exceeds the reference voltage $V_B$ and also where the reference voltage $V_B$ exceeds the reference voltage $V_A$.

When $V_A$ is greater than $V_B$ it is seen current will at all times flow through the potentiometers R8 and R9 to insure conduction of one diode of the diode pair D5 and D6 and one diode of the diode pair D7 and D8, thereby providing for a single break point for each pair of diodes. Thus, the potentiometers R8 and R9 serve a similar function to the resistances R4 and R5 of FIGURES 2(*a*) and 3(*a*) respectively while also serving as adder impedances.

When the output of the cathode follower V1 is less than $V_B$ the diodes D6 and D7 are forward biased and current flows from $V_A$ through diode D6, potentiometers R8 and R9 and diode D7. The diodes D5 and D8 are reverse biased when the diodes D6 and D7 are forward biased. In this situation the potentiometer R8 serves as a shunt load impedance whereas the potentiometer R9 serves as a series driving impedance.

When the output of the cathode follower V1 increases to the reference voltage $V_B$ the diode D8 will become forward biased. Current now flows through diode D6, potentiometers R8 and R9 and diode D8. Diode D7 is now simultaneously reverse biased, a single break point occurring for the switching operation between diodes D7 and D8. The potentiometer R9 is thus switched from operation as a series driving impedance to operation as a shunt load impedance and a change in the slope of the characteristic will result as previously discussed.

When the output of the cathode follower V1 increases to the reference voltage $V_A$ the diode D5 will become forward biased. Thus, current flows through diode D5, potentiometers R8 and R9 and diode D8. By this action the diode D6 is reverse biased at the same time that diode D5 becomes forward biased so that a single break point occurs.

The potentiometer R8 is thus switched from operation as a shunt load impedance to operation as a series driving impedance and a change in the slope of the characteristic results as previously discussed.

Thus, it is seen that when $V_A$ is greater than $V_B$ the characteristic comprises three main regions, the slope of the characteristic in each region changing at the associated break point to the slope of the next adjacent region.

When the reference voltage $V_B$ is greater than the reference voltage $V_A$ current does not continuously flow through the potentiometers R8 and R9 and individual break points occur for each of the diodes D5–D8 thereby causing irregularities in the resulting characteristic.

In this regard, when the output of the cathode follower V1 is below $V_A$ the diodes D6 and D7 are conducting and the diodes D5 and D8 are reverse biased. Accordingly, R8 serves as a shunt load impedance whereas R9 serves as a series driving impedance. During this situation current flows through diode D6, potentiometers R8 and R9 and diode D7.

When the output of the cathode follower V1 reaches a level which is slightly below $V_A$ by an amount equal to the voltage drops across the diodes D6 and D7, the diode D7 becomes reverse biased. The switching of the diode D7 interrupts the current flowing through the potentiometer R9 since the current cannot flow to the higher potential represented by the reference potential $V_B$. Thus, diode D8 is not switched at the same time as is diode D7 and discrete break points occur for these two elements. Since neither diode D7 nor D8 is conducting during this situation the potentiometer R9 does not enter into the circuit, the potentiometer R8 continuing to act as a shunt load impedance.

When the voltage at the output of the cathode follower V1 rises to a level below $V_A$ by an amount equal to the voltage drop across diode D6 the diode D6 will become reverse biased. During this situation it will be seen that none of the diodes D5–D8 are conducting and, accordingly, neither potentiometers R8 nor R9 has any effect on the circuit.

The circuit continues in this condition until the output of the cathode follower V1 reaches a level equal to the reference potential $V_B$ plus the voltage drop across diode D8. At this point the diode D8 becomes forward biased. The potentiometer R9 is now switched into operation as a shunt load impedance.

The latter condition continues until a voltage level is reached which is equal to $V_B$ plus the voltage drop across the diodes D5 and D8. At this point the diode D5 becomes forward biased and the potentiometer R8 is switched into operation as a series driving impedance.

Thus, it is seen that each of the diodes D5–D8 has associated therewith a discrete break point and that irregularities exist in the resultant characteristics. These irregularities exist in first and second regions. The first region is defined by a voltage equal to $V_A$ minus the drop across diode D6 and a voltage equal to $V_A$ minus the drops across diodes D6 and D7. The second region is defined by a voltage equal to $V_B$ plus the drop across diode D8 and a voltage defined by $V_B$ plus the drops across diodes D5 and D8.

As contrasted to the situation where $V_A$ is greater than $V_B$ it is seen that when $V_B$ is greater than $V_A$ the characteristic comprises three main regions separated by intermediate regions which take the form of irregularities having a slope differing from that of the adjacent main regions.

It is seen that the irregularities thus caused are relatively small and should have little effect on circuit operation especially where the signal level is relatively high. However, in low signal applications it may be desirable to utilize the more generalized gamma correction circuitry discussed in connection with FIGURES 1–4.

Although the invention has been described with respect to certain specific embodiments it will be appreciated that modifications and changes may be made by those skilled in the art without departing from the spirit and scope of the invention.

What is claimed is:

1. Gamma correction circuitry for positioning between first and second video stages in a television system, said circuitry comprising:

(a) a series driving impedance connected between the output of said first video stage and the input of said second video stage, (b) an adder impedance, (c) a logic element having first, second, and third terminals, said first terminal being connected to the input of said second video stage through said impedance, (d) said second terminal being connected to the output of said first video stage, (e) said third terminal being connected to an A.C.

ground and having a D.C. reference potential applied thereto, (f) said logic element including means responsive to the relative magnitudes of the reference potential and the voltage at the output of said first video stage to selectively connect the first terminal of said logic element to either of said second and third terminals in such a manner that said adder impedance is connected alternately in series and in parallel with the second video stage, (g) said impedances and logic element having circuit values such that current flows through said adder impedance both before and after the output of the first video stage exceeds said D.C. reference potential.

2. The gamma correction circuitry defined in claim 1 wherein said logic element comprises first and second inversely-poled, serially-connected unidirectional conduction devices, (a) the junction between said first and second unidirectional conduction devices being connected to said first terminal, (b) said first unidirectional conduction device being connected to said second terminal, and (c) said second unidirectional conduction device being connected to said third terminal.

3. The gamma correction circuitry defined in claim 2 wherein the cathodes of said unidirectional conduction devices are commonly connected.

4. The gamma correction circuitry defined in claim 2 wherein the anodes of said unidirectional conduction devices are commonly connected.

5. Gamma correction circuitry for positioning between first and second video stages in a television system, said circuitry comprising:

(a) a series driving impedance connected between the output of said first video stage and the input of said second video stage, (b) an adder impedance, (c) a plurality of logic elements, each element having first, second and third terminals, said first terminal of each element being connected to the input of said second video stage through said adder impedance, (d) said second terminal of each element being connected to the output of said first video stage, (e) said third terminal of each element being connected to an A.C. ground and having a D.C. reference potential applied thereto, (f) said logic elements each including means reponsive to the relative magnitudes of the associated reference potential and the voltage at the output of said first video stage to selectively connect the associated first terminal of each of said logic elements to either of said associated second and third terminals so as to perform a SPDT switching operation in such a manner that said adder impedance is connected alternately in series and in parallel with the second video stage, (g) a resistor connected between said third terminal and a supply voltage to provide said A.C. ground whereby said first terminal is alternately at ground potential and the potential of the output of said first video stage.

6. Gamma correction circuitry for positioning between first and second video stages in a television system, said circuitry comprising:

(a) a series driving impedance connected between the output of said first video stage and the input of said second video stage, and a plurality of adder impedances, (b) a first logic element having first and second serially-connected unidirectional conduction devices, the anodes of said unidirectional conduction devices being commonly connected, the serial arrangement of said first and second unidirectional conduction devices being connected between the output of said first video stage and a source of reference potential, the junction between said first and second unidirectional conduction devices being connected to the input of said second video stage through one of said impedance means in such a manner that said adder impedance is connected alternately in series and in parallel with the second video stage, (c) a second logic element including third and fourth serially-connected unidirectional conduction devices, the cathodes of said third and fourth unidirectional conduction devices being commonly connected, the serial arrangement of said third and fourth unidirectional conduction devices being connected between the output of said first video stage and a source of reference potential, the junction between said third and fourth unidirectional devices being connected to the input of said second video stage through one of said impedance means in such a manner that said adder impedance is connected alternately in series and in parallel with the second video stage.

7. The gamma correction circuitry defined in claim 6 wherein said first video stage comprises a cathode follower.

References Cited by the Examiner

UNITED STATES PATENTS

| | | | |
|---|---|---|---|
| 2,352,488 | 6/1944 | Mayle | 328—142 X |
| 2,581,124 | 1/1952 | Moe | 323—66 |
| 2,697,201 | 12/1954 | Harder | 323—66 |
| 2,773,981 | 12/1956 | Goodall. | |
| 2,831,107 | 4/1958 | Raymond et al. | |
| 2,895,046 | 7/1959 | Martin | 328—142 |
| 2,924,711 | 2/1960 | Kretzmer. | |
| 3,165,639 | 1/1965 | Robinson | 307—88.5 |

OTHER REFERENCES

Strauss, Wave Generation and Shaping, (textbook) McGraw-Hill 1960, p. 48–50.

References Cited by the Applicant

UNITED STATES PATENTS

| | | |
|---|---|---|
| 2,428,541 | 10/1947 | Bagley. |
| 2,773,980 | 12/1956 | Oliver. |
| 2,956,157 | 10/1960 | Graham. |

ARTHUR GAUSS, *Primary Examiner.*

I. C. EDELL, *Assistant Examiner.*